(12) United States Patent
Mahli et al.

(10) Patent No.: US 9,527,336 B2
(45) Date of Patent: Dec. 27, 2016

(54) CLEANABLE ARTICLES AND METHODS FOR MAKING AND USING SAME

(71) Applicant: 3M INNOVATIVE PROPERTIES COMPANY, St. Paul, MN (US)

(72) Inventors: David M. Mahli, Woodbury, MN (US); Robert A. Yapel, Oakdale, MN (US); Justin A. Riddle, St. Paul, MN (US); Mitchell A. F. Johnson, Maplewood, MN (US); Moses M. David, Woodbury, MN (US); Frederick J. Gustafson, Bloomington, MN (US); Lan H. Liu, Rosemount, MN (US); Yu Yang, Eden Prairie, MN (US); Naiyong Jing, Woodbury, MN (US); Caleb T. Nelson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

(21) Appl. No.: 14/368,359

(22) PCT Filed: Dec. 28, 2012

(86) PCT No.: PCT/US2012/072097
§ 371 (c)(1),
(2) Date: Jun. 24, 2014

(87) PCT Pub. No.: WO2013/102099
PCT Pub. Date: Jul. 4, 2013

(65) Prior Publication Data
US 2014/0329012 A1   Nov. 6, 2014

Related U.S. Application Data

(60) Provisional application No. 61/581,536, filed on Dec. 29, 2011.

(51) Int. Cl.
*B43L 1/00* (2006.01)
*C09D 183/04* (2006.01)

(52) U.S. Cl.
CPC .................. *B43L 1/002* (2013.01); *B43L 1/00* (2013.01); *C09D 183/04* (2013.01); *Y10T 428/31663* (2015.04)

(58) Field of Classification Search
None
See application file for complete search history.

(56) References Cited

U.S. PATENT DOCUMENTS 4,152,165 A   5/1979   Langager
4,338,377 A   7/1982   Beck
(Continued)

FOREIGN PATENT DOCUMENTS

JP         05-331455         12/1993
KR   10-2011-0097162 A       8/2011
(Continued)

OTHER PUBLICATIONS

International Search Report PCT International Application No. PCT/US2012/072097 mailed on May 24, 2013, 4 pages.

*Primary Examiner* — Erma Cameron
(74) *Attorney, Agent, or Firm* — Robert H. Jordan (57) ABSTRACT

Cleanable articles having overcoats with hydrophilic front surfaces and which are siloxane-bonded to an underlying body member. Also, methods of making and using such articles.

12 Claims, 1 Drawing Sheet

(56) References Cited

U.S. PATENT DOCUMENTS

| | | |
|---|---|---|
| 5,686,142 A | 11/1997 | Wallack |
| 5,882,774 A | 3/1999 | Jonza |
| 5,936,703 A | 8/1999 | Miyazaki |
| 6,040,053 A | 3/2000 | Scholz |
| 6,660,388 B2 | 12/2003 | Liu |
| 6,696,157 B1 | 2/2004 | David |
| 6,815,040 B2 | 11/2004 | Pellerite |
| 6,841,190 B2 | 1/2005 | Liu |
| 6,881,538 B1 | 4/2005 | Haddad |
| 6,991,695 B2 | 1/2006 | Tait |
| 7,099,083 B2 | 8/2006 | Johnson |
| 7,173,778 B2 | 2/2007 | Jing |
| 7,413,807 B2 | 8/2008 | Qiu |
| 2004/0081844 A1 | 4/2004 | Bharti |
| 2007/0042176 A1* | 2/2007 | Sugibuchi ............... A63H 33/38 428/331 |
| 2009/0002905 A1 | 1/2009 | Ramakrishna |
| 2009/0029054 A1* | 1/2009 | Yapel ...................... B05D 1/40 427/359 |
| 2009/0148603 A1* | 6/2009 | Goscha ................... B05D 5/08 427/256 |
| 2009/0202816 A1 | 8/2009 | Schlenoff |
| 2010/0092671 A1* | 4/2010 | Goscha ..................... B43L 1/00 427/256 |
| 2010/0171929 A1 | 7/2010 | Liu |

FOREIGN PATENT DOCUMENTS

| | | |
|---|---|---|
| WO | WO 95-17303 | 6/1995 |
| WO | WO 99-36248 | 7/1999 |
| WO | WO 99-39224 | 8/1999 |
| WO | WO 01-66820 | 9/2001 |
| WO | WO 2007-146680 | 12/2007 |
| WO | WO 2009-119690 | 10/2009 |
| WO | WO 2010-141261 | 12/2010 |
| WO | WO 2010-141345 | 12/2010 |
| WO | WO 2011-028373 | 3/2011 |
| WO | WO 2011/041135 A2 | 4/2011 |
| WO | WO 2011-056475 | 5/2011 |
| WO | WO 2011-094342 | 8/2011 |
| WO | WO 2011-094350 | 8/2011 |
| WO | WO 2011-140018 | 11/2011 |
| WO | WO 2011-149715 | 12/2011 |
| WO | WO 2011-163175 | 12/2011 |

\* cited by examiner

CLEANABLE ARTICLES AND METHODS FOR MAKING AND USING SAME

This application is the national stage of PCT/US2012/072097, filed Dec. 28, 2012, which claims benefit to U.S. Provisional Patent Application No. 61/581,536, filed Dec. 29, 2011.

FIELD

The present invention relates to articles with cleanable surfaces, methods for making them, and methods for using them.

BACKGROUND

Easy cleanability of surfaces, e.g., removal of dirt and grime, graffiti, or erasable surfaces, is a long standing desired feature. Illustrative applications where easy cleanability is desired include windows, electronic device screens, work surfaces, appliances, door and wall surfaces, signs, etc. Other illustrative applications include writable surfaces such as dry erase boards, file folders, notebooks, etc. where effective writability coupled with later easy removal of the writing is desired.

Articles having cleanable surfaces have been made from a variety of materials offering various combinations of properties. Commonly recognized embodiments include certain label materials, dry erase articles, note papers, file folders with cleanable tabs, etc.

Dry erase boards have been used as writing surfaces for years because of their convenience and versatility. The boards provide a means for expression which eliminates the mess and trouble of a chalk board.

A standing challenge for dry erase articles is to find surfaces that can be easily cleaned, resist staining when written on with permanent markers, can be easily erased when written on with conventional dry erase markers, are durable, and so forth. Glass and porcelain surfaces have been long used in the writing surfaces of dry erase articles but improved performance is desired, for instance, though their non-porous surfaces are easily written on with dry erase markers and then easily erased after one day, the writing builds adhesion to the board over time becoming difficult or even impossible to remove by wiping with a dry eraser. Dry erase writing that is not removable by a dry eraser is commonly called ghosting. In addition, permanent markers tend to adhere well and cannot be easily removed. For example, such writing is often removable only with solvents such as isopropanol. Solvent based cleaners are being replaced in the marketplace with cleaners containing water, surfactant, and a few percent of a less volatile organic solvent. Such cleaners are not always capable of removing permanent marker writing from dry erase boards. Other common dry erase surfaces with the same cleaning problems include coated film, melamine, and painted plastic and steel.

A continuing need is for cleanable writable surfaces that exhibit robust durable performance; improved receptivity to writing with a variety of writing instruments under a variety of conditions; and improved erasability and cleanability exhibiting low ghosting properties.

SUMMARY

The present invention relates to cleanable articles that provide surprising performance. It also relates to methods for making such articles and methods for using such articles.

Briefly summarizing, the method of the invention for making cleanable articles comprises: (a) providing a body member having a front surface wherein at least a portion of the front surface is siloxane-bondable; (b) applying an overcoating composition to at least a portion of the siloxane-bondable surface, the overcoating composition comprising a siloxane-bondable component; and (c) curing the overcoating composition to form a hydrophilic overcoat having a siloxane bond to the front surface of the body member, thereby yielding a cleanable article.

In brief summary, cleanable articles of the invention comprise: (a) a body member having a front surface; and (b) a hydrophilic overcoat bonded to the front surface of the body member via siloxane bonds.

Briefly summarizing, an illustrative method of the invention for using such cleanable articles comprises, for instance: (a) providing a cleanable article as described herein; (b) writing on the hydrophilic overcoat thereof to generate a legend thereon; and (c) wiping, optionally with water or other solvent, to remove at least a portion of such legend.

It has been discovered that cleanable articles made as described herein exhibit surprising performance, that is, they can be easily and effectively cleaned, repeatedly. Articles of the invention can be used in many demanding applications, for instance, they are particularly well suited for use as dry erase surfaces. They exhibit excellent writability with conventional dry erase markers yet writing from permanent markers can be readily removed therefrom with water and a cloth or eraser. No special solvents or tools need be used. Articles of the invention provide heretofore unattained utility and durability. For convenience, the invention is described with reference to rewritable articles. It will be understood, however, that the advantageous benefits of the invention are attained in many other applications.

BRIEF DESCRIPTION OF DRAWING

The invention is further explained with reference to the drawing wherein.

These FIGURES are not to scale and are intended to be merely illustrative and not limiting.

Key and Glossary

Various terms used herein will be understood to be defined according to their ordinary meaning, as known by those skilled in the art. However, the following terms will be understood to have the meanings set forth herein.

The terms "a," "an," "the," "at least one," and "one or more" are used interchangeably.

As used herein, all numbers are assumed to be modified by the term "about" and preferably by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

The term "coatable material" means a non-solid (e.g., liquid or gel-like) material that is capable of being coated onto a surface.

The term "comprises" and variations thereof do not have a limiting meaning where these terms appear in the description and claims.

The term "dry erase board" includes known dry erase surfaces such as glass, porcelain steel, painted steel, painted metal, painted hardboard, melamine, coated film, coated paper, coated fiberboard sheets, and other dry erase surfaces known in current commerce.

The phrases "in the range" and "within a range" (and similar statements) include the endpoints of the stated range.

The term "matte finish" means a rough or granular surface finish or texture that is lacking a high luster or gloss. The matte finish may be smooth to the touch but is generally free from significant shine or highlights.

The term "optically clear" refers to the transparency of a material, typically permitting a high level (e.g., more than about 99% when corrected for reflection losses) of light transmission and low haze (e.g., less than about 1%).

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "polymeric material" will be understood to include polymers, as defined above, and other organic or inorganic additives, such as, for example, antioxidants, stabilizers, antiozonants, plasticizers, dyes, UV absorbers, hindered amine light stabilizers (HALS), and pigments.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "or" is generally employed in its sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc.).

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

As used herein, the following terms have the indicated meanings: "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups), in the context of the present invention, the organic groups are those that do not interfere with the formation of a wipe-away dry erase and permanent marker surface; "aliphatic group" means a saturated or unsaturated linear or branched hydrocarbon group, this term is used to encompass alkyl, alkenyl, and alkynyl groups, for example; "alkyl group" means a saturated linear or branched hydrocarbon group including, for example, methyl, ethyl, isopropyl, t-butyl, heptyl, dodecyl, octadecyl, amyl, 2-ethylhexyl, and the like; "alkylene group" is a divalent alkyl group; "alkenyl group" means an unsaturated, linear or branched hydrocarbon group with one or more carbon-carbon double bonds, such as a vinyl group; "alkynyl group" means an unsaturated, linear or branched hydrocarbon group with one or more carbon-carbon triple bonds; "cyclic group" means a closed ring hydrocarbon group that is classified as an alicyclic group, aromatic group, or heterocyclic group; "alicyclic group" means a cyclic hydrocarbon group having properties resembling those of aliphatic groups; "aromatic group" or "aryl group" means a mono- or polynuclear aromatic hydrocarbon group; and "heterocyclic group" means a closed ring hydrocarbon in which one or more of the atoms in the ring is an element other than carbon (e.g., nitrogen, oxygen, sulfur, etc.). A group that may be the same or different is referred to as being "independently" something.

Substitution is anticipated on the organic groups of the complexes of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "primary particle size" refers to the average size of unagglomerated single particles of silica.

As used herein, "hydrophilic" is used to refer to a surface that is wet by aqueous solutions, and does not express whether or not the layer absorbs aqueous solutions. Surfaces on which drops of water or aqueous solutions exhibit a static water contact angle of less than 50° are referred to as "hydrophilic". Hydrophobic substrates have a water contact angle of 50° or greater.

As used herein, "at least a monolayer of a hydrophilic-functional compound" includes, e.g., (1) a monolayer or a thicker layer of molecules, covalently bonded (through siloxane bonds) to the surface or primer on the surface of a substrate, wherein such molecules are derived from the hydrophilic-functional compound and (2) a monolayer or a thicker layer of a water soluble polymer covalently bonded to the surface or primer on the surface of a substrate. If the hydrophilic-functional compound includes dimers, trimers, or other oligomers of individual molecules, then "at least a monolayer" would include a monolayer of such dimers, trimers, or other oligomers, or a mixture of such oligomers with monomers.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
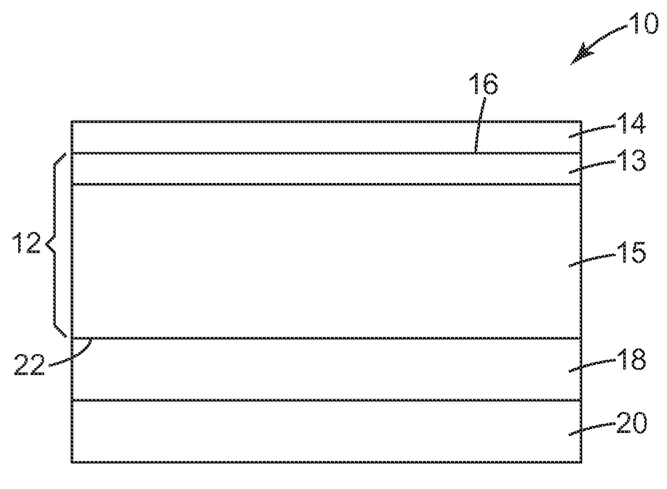
FIG. 1 is a schematic view of an illustrative embodiment of a cleanable article of the invention.

FIG. 1 shows an illustrative embodiment of a cleanable article of the invention 10 comprising body member 12 with overcoat 14 siloxane bonded to the front surface 16 thereof. In the embodiment shown, body member 12 comprises base member 15 with facing layer 13 on the front surface thereof. Article 10 further comprises optional adhesive layer 18 and optional removable liner 20 on the back surface 22 of body member 12.

As described above, the method for making cleanable articles of the invention comprises: (a) providing a body member having a front surface wherein at least a portion of the front surface is siloxane-bondable; (b) applying an overcoating composition to at least a portion of the siloxane-bondable front surface, the overcoating composition comprising a siloxane-bondable component; and (c) curing the overcoating composition to form an overcoat having a siloxane bond to the front surface of the body member, yielding a cleanable article.

Body Member

The body member typically substantially constitutes the main portion of the article for which a cleanable surface in accordance with the invention is desired. For instance, it may be a panel of a door, window, ceiling or other architectural surface, a surface of a cabinet or piece of furniture, surface of a sign or white board, a surface on a personal article such as a notebook, clipboard, etc. Those skilled in the art will be able to carry out the invention using a variety of body members, e.g., of suitable configuration and construction for the intended application, in accordance with the invention disclosed herein.

In addition to exhibiting other desired characteristics, the front surface of the body layer must exhibit siloxane-bondable character. In some embodiments, siloxane-bondable capability of the body member is achieved by incorporating a siloxane-bondable layer as the front surface of the body member, e.g., by forming a suitable layer on an underlying base member. In other embodiments, siloxane-bondable capability of the body member is achieved by incorporating siloxane-bondable components within the body member at the front surface thereof, e.g., suitable siloxane-bondable nanoparticles that protrude therefrom.

Front Surface of Body Member

At least a portion of the front surface of the body member, and preferably essentially the entire front surface thereof, is siloxane-bondable, i.e., capable of forming siloxane bonds with a compatibly formulated overcoat. This characteristic may be an inherent characteristic of the material of which the front portion of the body member is composed, e.g., exposed siloxane-bondable particles entrained in a polymeric matrix or by provision of a siloxane-bondable facing layer as the front surface of the body member, e.g., formation of a "diamond-like glass" facing layer on the surface of a polyester film base member.

In some illustrative embodiments, the body member comprises a layer of the reaction product of a mixture comprising at least one curable component selected from the group consisting of (meth)acrylate monomers, (meth)acrylate oligomers. Other curable materials will be selected for still other embodiments in accordance with the present invention.

Coatable materials suitable for use in the present invention may comprise any of a variety of film forming materials. In some embodiments, the coatable material is a polymeric material comprised of one or more polymers and/or oligomers in solvent. In some embodiments, the coatable material is a mixture of one or more monomers, oligomers and/or polymers in one or more solvents. In other embodiments, the coatable material includes the foregoing oligomer(s), monomer(s) and/or polymer(s) in one or more solvents along with a volume of particles or nanoparticles.

In some embodiments, the body member comprises nanoparticles. Illustrative examples of nanoparticles which might be used in body members of the invention include aluminum oxides, antimony tin oxide, bismuth subsalicylate, boemite, calcium carbonate, calcium phosphate, cerium dioxide, graphene, halloysite, lanthanum boride, lithium carbonate, silver, amorphous silica, colloidal silica, silicon dioxide, titanium dioxide, zinc oxide, zirconium oxide, and zirconium dioxide. Suitable nanoparticles can be of many shapes including irregular and regular shapes, nanotubes, nanoplatelets, cylindrical, etc.

In certain embodiments, applying a primer coating composition to a writing surface involves contacting the substrate surface with a nanoparticle-containing coating composition. The nanoparticle-containing coating composition includes an aqueous dispersion having a pH of less than about 5 including silica nanoparticles having average particle diameters of about 40 nanometers or less, and an acid having a pKa of ≤ about 3.5. The method further includes drying the nanoparticle-containing coating composition to provide a silica nanoparticle primer coating on the substrate surface. In certain embodiments, if desired, the nanoparticle-containing coating composition further includes a tetraalkoxysilane. In certain embodiments of the coated article, the nanoparticle-containing primer coating is about 100 angstroms (Å) to about 10,000 Å thick. In certain embodiments of the coated article, the sulfonate-functional coating is no greater than about 10 microns thick, and often no greater than about 1 micron thick.

Nanoparticles can be surface modified which refers to the fact that the nanoparticles have a modified surface so that the nanoparticles provide a stable dispersion. "Stable dispersion" refers to a dispersion in which the colloidal nanoparticles do not agglomerate after standing for a period of time, such as about 24 hours, under ambient conditions, e.g., room temperature (about 20 to about 22° C.), and atmospheric pressure, without extreme electromagnetic forces.

Surface-modified colloidal nanoparticles can optionally be present in a polymer coating used as a coatable composition herein with nanoparticles present in an amount effective to enhance the durability of the finished or optical element. The surface-modified colloidal nanoparticles described herein can have a variety of desirable attributes, including, for example, nanoparticle compatibility with a coatable composition such that the nanoparticles form stable dispersions within the coatable composition, reactivity of the nanoparticle with the coatable composition making the composite more durable, and a low impact or uncured composition viscosity. A combination of surface modifications can be used to manipulate the uncured and cured properties of the composition. Surface-modified nanoparticles can improve optical and physical properties of the coatable composition such as, for example, improved resin mechanical strength, minimized viscosity changes while increasing solids volume loading in the coatable composition and maintain optical clarity while increasing solid volume loading in the coatable composition.

In some embodiments, the nanoparticles are surface-modified nanoparticles. Suitable surface-modified colloidal nanoparticles can comprise oxide particles. Nanoparticles may comprise a range of particle sizes over a known particle size distribution for a given material. In some embodiments, the average particle size may be within a range from about 1 nm to about 100 nm. Particle sizes and particle size distributions may be determined in a known manner including, for example, by transmission electron microscopy (TEM). Suitable nanoparticles can comprise any of a variety of materials such as metal oxides selected from alumina, tin oxide, antimony oxide, silica, zirconia, titania and combinations of two or more of the foregoing. Surface-modified colloidal nanoparticles can be substantially fully condensed.

In some embodiments, silica nanoparticles can have a particle size ranging from about 5 to about 75 nm. In some embodiments, silica nanoparticles can have a particle size ranging from about 10 to about 30 nm. Silica nanoparticles can be present in the coatable composition in an amount from about 10 to about 95 percent by weight. In some embodiments, silica nanoparticles can be present in the coatable composition in an amount from about 25 to about 80 percent by weight, and in other embodiments, silica nanoparticles can be present in the coatable composition in an amount from about 30 to about 70 percent by weight. Silica nanoparticles suitable for use in the coatable compositions of the present invention are commercially available from Nalco Chemical Co. (Naperville, Ill.) under the product designation NALCO™ Colloidal Silicas. Suitable silica products include NALCO™ Products 1040, 1042, 1050, 1060, 2327 and 2329. Suitable fumed silica products include for example, products sold under the tradename AEROSIL™ series OX-50, -130, -150, and -200 from DeGussa AG, (Hanau, Germany), and CAB-O-SPERSE™ 2095, CAB-O-SPERSE™ A105, CAB-O-SIL™ MS from Cabot Corp. (Tuscola, Ill.). Surface-treating the nanosized particles can provide a stable dispersion in the coatable composition (e.g., a polymeric resin). Preferably, the surface-treatment stabilizes the nanoparticles so that the particles will be well dispersed in the coatable composition and results in a substantially homogeneous composition. Furthermore, the nanoparticles can be modified over at least a portion of its surface with a surface treatment agent so that the stabilized particle can copolymerize or react with the coatable composition during curing.

Metal oxide nanoparticles can be treated with a surface treatment agent to make them suitable for use in the present invention. In general, a surface treatment agent has a first end that will attach to the particle surface (covalently, ionically or through strong physiosorption) and a second end that imparts compatibility of the particle with the coatable composition and/or reacts with coatable composition during curing. Examples of surface treatment agents include alcohols, amines, carboxylic acids, sulfonic acids, phosphonic acids, silanes and titanates. The type of treatment agent can depend on the nature of the metal oxide surface. For example, silanes are typically preferred for silica and other siliceous fillers. Surface modification can be accomplished either subsequent to mixing with the coatable composition or after mixing. It may be preferred in the case of silanes to react the silanes with the particle or nanoparticle surface before incorporation into the coatable composition. The amount of surface modifier can depend on factors such as particle size, particle type, modifier molecular weight, and modifier type. In general, a monolayer of modifier is attached to the surface of the particle. The attachment procedure or reaction conditions required also depend on the surface modifier used. For silanes, surface treatment may take place at elevated temperatures under acidic or basic conditions during a period of about 1 hour up to about 24 hours.

Surface treatment agents suitable for particles to be included in the coatable composition include compounds such as, for example, isooctyl trimethoxy-silane, N-(3-triethoxysilylpropyl) methoxyethoxyethoxyethyl carbamate (PEG3TES), SILQUEST™ A1230, N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

Surface modification of the particles in a colloidal dispersion can be accomplished in a number of ways. The process involves the mixture of an inorganic dispersion with surface modifying agents and, optionally, a co-solvent such as, for example, 1-methoxy-2-propanol, ethanol, isopropanol, ethylene glycol, N,N-dimethylacetamide and 1-methyl-2-pyrrolidinone. Co-solvent can be added to enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface-modified sol. In one method, where metal oxides are surface-modified, the surface treatment of the metal oxide can involve the adsorption of acidic molecules to the particle surface. The surface modification of the heavy metal oxide preferably takes place at room temperature.

In some embodiments, the average particle sizes (e.g., particle diameter) may be within the range from about 0.05 micron to about 60 microns. In addition to the foregoing particle sizes, use of smaller and larger average particle sizes are also contemplated. In embodiments of the invention, at least a portion of the foregoing particles may be surface modified in the manner described above. In other embodiments, all of the particles are surface modified. In still other embodiments, none of the particles are surface modified.

Depending upon the desired application, the front surface of the body member may have a matte finish or a glossy finish.

In some embodiments the body member is formed by applying a suitable coating composition to at least a portion of the front surface of a substrate and curing the composition to yield the body member in situ on the substrate, e.g., the surface of piece of furniture, door, window, etc. In other embodiments, a preformed body member or preformed cleanable article of the invention is bonded to at least a portion of the front surface of the substrate, e.g., lamination and self adhesion or use of a bonding adhesive or other tie layer.

At least a portion of the front surface of the body member, and in some instances essentially the entire front surface thereof, is siloxane-bondable, i.e., capable of forming siloxane bonds with a compatibly formulated overcoat. This capability may be an inherent characteristic of the material of which the front portion of thebody member is composed, e.g., exposed siloxane-bondable particles entrained in a polymeric matrix or by provision of a siloxane-bondable composition as the front surface of the body member, e.g., formation of a "diamond-like glass", facing layer on the surface of a polyester film.

In some embodiments, siloxane-bondable capability of the body member is achieved by exposing siloxane-bondable particles in the polymer matrix. Illustrative examples of methods of achieving this are treatment of the front surface with plasma etching, corona, flame, etc.

U.S. Pat. No. 6,696,157 (David et al.) discloses diamond-like glass (sometimes referred to as "DLG") films and methods for making them which can be used in the present invention. An advantage of such materials is that in addition to providing the siloxane-bondable front surface on the body member which provides strong bond to the overcoat, such layers can in addition provide stiffness and dimensional stability that serves to support the overlying overcoat, making the resultant cleanable article more durable and resistant to marring. This is particularly helpful when the underlying components of the base member may be relatively softer.

Illustrative diamond-like glass materials suitable for use herein comprise a carbon-rich diamond-like amorphous covalent system containing carbon, silicon, hydrogen and oxygen. The DLG is created by depositing a dense random covalent system comprising carbon, silicon, hydrogen, and oxygen under ion bombardment conditions by locating a substrate on a powered electrode in a radio frequency ("RF") chemical reactor. In specific implementations, DLG is deposited under intense ion bombardment conditions from mixtures of tetramethylsilane and oxygen. Typically, DLG shows negligible optical absorption in the visible and ultraviolet regions, i.e., about 250 to about 800 nm. Also, DLG usually shows improved resistance to flex-cracking compared to some other types of carbonaceous films and excellent adhesion to many substrates, including ceramics, glass, metals and polymers.

DLG contains at least about 30 atomic percent carbon, at least about 25 atomic percent silicon, and less than or equal to about 45 atomic percent oxygen. DLG typically contains from about 30 to about 50 atomic percent carbon. In specific implementations, DLG can include about 25 to about 35 atomic percent silicon. Also, in certain implementations, the DLG includes about 20 to about 40 atomic percent oxygen. In specific advantageous implementations the DLG comprises from about 30 to about 36 atomic percent carbon, from about 26 to about 32 atomic percent silicon, and from about 35 to about 41 atomic percent oxygen on a hydrogen free basis. "Hydrogen free basis" refers to the atomic composition of a material as established by a method such as Electron Spectroscopy for Chemical Analysis (ESCA), which does not detect hydrogen even if large amounts are present in the thin films.

Base Member of Body Member

Typically the base member consists essentially of or has a surface comprising a sheet of glass, ceramic, porcelain, paper, metal, or plastic. In some embodiments the base member is a polymeric film. Illustrative examples include polymeric films selected from the group consisting of polyester (e.g., polyethylene terephthalate, polybutyleneterephthalate), olefin (e.g., polypropylene, polyethylene), polyvinyl chloride, polycarbonate, allyldiglycol carbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, biopolymers, polylactic acid, and blends thereof.

As desired, the base member may be opaque, translucent, transparent or clear. In some embodiments, the base member will be retroreflective. The term transparent means transmitting at least about 85% of incident light in the visible spectrum (about 400 to about 700 nm wavelength). Substrates may be colored.

Base members used herein may be flexible or inflexible as desired.

In some embodiments, the base member will be substantially self-supporting, i.e., sufficiently dimensionally stable to hold its shape as it is moved, used, and otherwise manipulated. In some embodiments, the article will be further supported in some fashion, e.g., with a reinforcing frame, adhered to a supporting surface, etc.

If desired, the body member may be provided with graphics on the surface thereof or embedded therein, such as words or symbols as known in the art, which will be visible through the overlying overcoat.

In many embodiments the base member will be substantially planar but as will be understood may also be configured in curved or complex shapes.

Any of a variety of materials may be suitable for use as base member 15 including flexible materials such as, for example, woven materials, knitted materials, films (e.g., polymeric films), nonwovens, metal sheet, metal foils, glass and the like. In some embodiments where the final film product is intended for use in optical applications such as in an optical display, the substrate material will be chosen based in part on the desired optical and mechanical properties for the intended use. Mechanical properties can include flexibility, dimensional stability and impact resistance. In some embodiments, an optically clear material (e.g., transparent) may be desired. Examples of suitable optically clear materials include optically clear polyester film, triacetate (TAC) film, polyethylene naphthalate, polycarbonate, cellulose acetate, poly(methyl methacrylate), polyolefins such as biaxially oriented polypropylene (BOPP) and simultaneously biaxially-oriented polypropylene (S-BOPP). The base member may comprise or consist of polyamides, polyimides, phenolic resins, polystyrene, styrene-acrylonitrile copolymers, epoxies, and the like.

The thickness of the base member can vary and will typically depend on the intended use of the final article. In some embodiments, substrate thicknesses are less than about 0.5 mm and typically between about 0.02 and about 0.2 mm.

Polymeric materials can be formed using conventional film-making techniques (e.g., extrusion and optional uniaxial or biaxial orientation of the extruded film). The base member 15 can be treated to improve adhesion with the facing layer, if any. Exemplary of such treatments include chemical treatment, corona treatment (e.g., air or nitrogen corona), plasma, flame, or actinic radiation. Interlayer adhesion can also be improved with the use of an optional tie layer or primer applied.

Where the finished articles are intended to be used in display panels, the base member 15 and other components of article 10 are typically light transmissive, meaning light can be transmitted so that the display can be viewed. Suitable light transmissive optical films include without limitation multilayer optical films, microstructured films such as retroreflective sheeting and brightness enhancing films (e.g. reflective or absorbing), polarizing films, diffusive films, as well as (e.g. biaxial) retarder films and compensator films such as described in U.S. Pat. No. 7,099,083 (Johnson et al.).

As described in, e.g., U.S. Pat. No. 6,991,695 (Tait et al.), multilayer optical films are films that provide desirable transmission and/or reflection properties at least partially by an arrangement of microlayers having differing refractive indices. Each of the microlayers are sufficiently thin so that light reflected at a plurality of such interfaces undergoes constructive or destructive interference to give the film its reflective or transmissive properties. For optical films designed to reflect ultraviolet, visible, or near-infrared wavelengths, each microlayer generally has an optical thickness (i.e., a physical thickness multiplied by its refractive index) of less than about 1 micron. Thicker layers can also be included such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

The reflective and transmissive properties of multilayer optical film are functions of the refractive indices of the respective microlayers. Each microlayer can be characterized at least at localized positions in the film by in-plane refractive indices nx, ny, and a refractive index nz associated with a thickness axis of the film. These indices represent the refractive index of the subject material for light polarized along mutually orthogonal x-, y- and z-axes. In practice, the refractive indices are controlled by judicious materials selection and processing conditions. Suitable films can be made by the co-extrusion of multiple layers, typically tens or hundreds of layers, of two alternating polymers (polymers A, B), followed by optionally passing the multilayer extrudate through one or more multiplication die, and then stretching or otherwise orienting the extrudate to form a final film. The resulting film is composed of multiple (e.g., tens or hundreds) microlayers whose thicknesses and refractive indices are tailored to provide one or more reflection bands in desired region(s) of the spectrum, such as in the visible or near infrared.

Exemplary materials that can be used in the fabrication of polymeric multilayer optical film can be found in PCT Publication No. WO 99/36248 (Neavin et al.). Desirably, at least one of the materials is a polymer with a stress optical coefficient having a large absolute value. In other words, the polymer preferably develops a large birefringence (at least about 0.05, more 25 preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layer's of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, etc. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/Eastar™ polyester and PET/Eastar™ polyester where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, and Eastar™ is a trade designation for a polyester or copolyester (believed to comprise cyclohexanedimethylene diol units and terephthalate units) commercially available from Eastman Chemical Co.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel™ thermoplastic polyester, PET/Ecdel™ thermoplastic polyester, PEN/sPS, PET/sPS, PEN/coPET, PEN/PETG, and PEN/THV™ fluoropolymers, where "PMMA" refers to polymethyl methacrylate, Ecdel™ is a trade designation for a thermoplastic polyester or copolyester (believed to comprise cyclohexanedicarboxylate units, polytetramethylene ether glycol units, and cyclohexanedimethanol units) commercially available from Eastman Chemical Co., and THV™ is a trade designation for a fluoropolymer commercially available from 3M Company.

Further details of suitable multilayer optical films and related constructions can be found in U.S. Pat. No. 5,882,774 (Jonza et al.), and PCT Publication Nos. WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. The polymeric films and film bodies can also comprise inorganic layers, such as metal or metal oxide coatings or layers.

In other embodiments, base member 15 may comprise or consist of any of a variety of non-polymeric materials, such as glass, metal sheeting, paper, cardboard, knitted materials, fabrics, or the like.

Overcoat

The overcoat 14 is formed by applying a curable liquid overcoating composition that comprises a siloxane-bondable component over the at least a portion of the front surface 16 of the body member 12. The coating composition is then cured such that a solid overcoat 14 which is siloxane-bonded to the body member is formed.

The resultant overcoat is hydrophilic, preferably highly so. In illustrative embodiments, the resultant overcoat is from about 0.3 to about 1 micron thick and underlying diamond-like glass facing layer of the body member is from about 0.1 to about 2 microns thick. Such combinations provide a useful combination of durable cleanability and mar resistance. It will be understood that articles of the invention can be made using other thicknesses of component layers.

In some embodiments, the overcoat comprises at least one Zwitterionic silane from the group consisting of phosphate silanes and sulfonate silanes. Such silanes include at least one phosphate group ($PO_4^{-3}$) or sulfonate group ($SO_3^-$) for imparting desired high hydrophilicity to the cleanable surface.

Illustrative examples of zwitterionic sulfonate-functional compounds include those disclosed in U.S. Pat. No. 5,936,703 (Miyazaki et al.) and PCT Application Nos. WO 2007/146680 (Schlenoff) and WO 2009/119690 (Yamazaki et al.).

In certain embodiments, the zwitterionic sulfonate-organosilanol compounds used in the solutions and compositions of the present invention have the following Formula (I) wherein:

wherein:
each $R^1$ is independently a hydrogen, methyl group, or ethyl group;
each $R^2$ is independently a methyl group or an ethyl group;
each $R^3$ and $R^4$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.

The organic linking group W of Formula (I) is preferably selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (I) are described in U.S. Pat. No. 5,936,703 (Miyazaki et al.) and PCT Application Nos. WO 2007/146680 and WO 2009/119690, and include the following zwitterionic functional groups ($-W-N^+(R^3)(R^4)-(CH_2)_m-SO_3^-$):

Sulfoalkyl imidazolium salts    Sulfoaryl imidazolium salts

Sulfoalkyl pyridinium salts    Sulfoalkyl ammonium salts (sulfobetaine)

Sulfoalkyl piperidinium salts

In certain embodiments, the sulfonate-organosilanol compounds used in the solutions and compositions of the present invention have the following Formula (II) wherein:

wherein:
each $R^1$ is independently a hydrogen, methyl group, or ethyl group;
each $R^2$ is independently a methyl group or an ethyl group;
p and m are integers of 1 to 3;
q is 0 or 1; and
p+q=3.

Suitable examples of zwitterionic compounds of Formula (II) are described in U.S. Pat. No. 5,936,703 (Miyazaki et al.), including, for example:

and

Other examples of suitable zwitterionic compounds, which can be made using standard techniques that are exemplified in the Examples Section, include the following:

The sulfonate-functional coating composition typically includes a sulfonate-functional compound in an amount of at least about 0.1 wt-%, and often at least about 1 wt-%, based on the total weight of the coating composition. The sulfonate-functional coating composition typically includes a sulfonate-functional compound in an amount of no greater than about 20 wt-%, and often no greater than 5 wt-%, based on the total weight of the coating composition. Generally, for monolayer coating thicknesses, relatively dilute coating compositions are used. Alternatively, relatively concentrated coating compositions can be used and subsequently rinsed.

The sulfonate-functional coating composition preferably includes alcohol, water, or hydroalcoholic solutions (i.e., alcohol and/or water). Typically, such alcohols are lower alcohols (e.g., $C_1$ to $C_8$ alcohols, and more typically $C_1$ to $C_4$ alcohols), such as methanol, ethanol, propanol, 2-propanol, etc. Preferably, the sulfonate-functional coating compositions are aqueous solutions. As it is used herein, the term "aqueous solution" refers to solutions containing water. Such solutions may employ water as the only solvent or they may employ combinations of water and organic solvents such as alcohol and acetone. Organic solvents may also be included in the hydrophilic treatment compositions so as to improve their freeze-thaw stability. Typically, the solvents are present in an amount up to about 50 percent by weight of the compositions and preferably in the range of about 5 to about 50 percent by weight of the compositions.

The sulfonate-functional coating composition can be acidic, basic, or neutral. The performance durability of the coatings can be affected by pH. For example, coating compositions containing sulfonate-functional zwitterionic compounds are preferably neutral.

The sulfonate-functional coating compositions may be provided in a variety of viscosities. Thus, for example, the viscosity may vary from a water-like thinness to a paste-like heaviness. They may also be provided in the form of gels. Additionally, a variety of other ingredients may be incorporated in the compositions.

Thus, for example, conventional surfactants, cationic, anionic, or nonionic surfactants can be used. Detergents and wetting agents can also be used. Typically, anionic surfactants, detergents, and wetting agents such as those described below for the Primer Composition are also useful in the sulfonate-functional coating compositions of the invention. The term "surfactant" as used herein describes molecules comprising hydrophilic (polar) and hydrophobic (non-polar) regions on the same molecule which are capable of reducing the surface tension of the coating solution. Useful surfactants may include those disclosed in U.S. Pat. No. 6,040,053 (Scholz et al.).

For typical concentrations of silica nanoparticles (e.g., about 0.2 to about 15 percent by weight relative to the total coating composition) most surfactants comprise less than about 0.1 percent by weight of the coating composition, preferably about 0.003 to about 0.05 percent by weight, in order to preserve the anti-reflective properties of the coating. It should be noted that with some surfactants a spotty coating is attained at concentrations in excess of what is needed to achieve the anti-fog property.

Anionic surfactants in the primer coating composition are preferred when added to improve the uniformity of the resulting coatings. Useful anionic surfactants include, but are not limited to, those with molecular structures comprising (1) at least one hydrophobic moiety, such as $C_6$ to $C_{20}$ alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate, e.g., TEXAPON™ L-100 from Henkel Inc., Wilmington, Del., or POLYSTEP™ B-3 from Stepan Chemical Co, Northfield, Ill.; sodium lauryl ether sulfate, POLYSTEP™ B-12 from Stepan Chemical Co., Northfield, Ill.; ammonium lauryl sulfate, e.g., STANDAPOL™ A from Henkel Inc., Wilmington, Del.; and sodium dodecyl benzene sulfonate, e.g., SIPONATE™ DS-10 from Rhone-Poulenc, Inc., Cranberry, N.J.

Where the primer coating composition does not include a surfactant or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols (e.g., BRIJ™ 30, and BRIJ™ 35, from ICI Americas, Inc., and TERGITOL™ TMN-6™ Specialty Surfactant, from Union Carbide Chemical and Plastics Co., polyethoxylated alkylphenols (e.g., TRITON™ X-100 from Union Carbide Chemical and Plastics Co., ICONOL™ NP-70 from BASF Corp.) and polyethylene glycol/polypropylene glycol block copolymer (TETRONIC™ 1502 Block Copolymer Surfactant, TETRONIC™ 908 Block Copolymer Surfactant and PLURONIC™ F38 Block Copolymer Surfactant, all from BASF Corp.). Of course, any added wetting agent must be included at a level which will not destroy the anti-reflective or anti-fog properties of the coating, if such features are desired. Generally the wetting agent is used in amounts of less than about 0.1 percent by weight of the coating composition, preferably about 0.003 to about 0.05 percent by weight of the coating composition depending on the amount of silica nanoparticles. Rinsing or steeping the coated article in water may be desirable to remove excess surfactant or wetting agent.

Sulfonate-functional coating compositions are preferably coated on the article using conventional techniques, such as bar, roll, curtain, rotogravure, spray, or dip coating techniques. The preferred methods include bar and roll coating, or air knife coating to adjust thickness.

The sulfonate-functional coatings of the present invention are preferably applied in a monolayer thickness. Typically, the sulfonate-functional coating is no greater than about 10 microns thick, and preferably no greater than about 1 micron thick, as measured using an ellipsometer such as a Gaertner Scientific Corp Model No. L115C.

Sulfonate-functional coatings of the present invention can be coated on both sides of a substrate if desired. Alternatively, the coatings of the present invention may be coated on one side of the substrate. Once coated, the sulfonate-functional article is typically dried at temperatures of about 20° C. to about 150° C. in a recirculating oven. An inert gas may be circulated. The temperature may be increased further to speed the drying process, but care must be exercised to avoid damage to the substrate.

The sulfonate-functional coating compositions provide anti-fog properties to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

Article

In addition, cleanable articles of the invention, e.g., dry erase articles, can further comprise such other optional components as frames, means for storing materials and tools such as writing instruments, erasers, cloths, note paper, etc., handles for carrying, protective covers, means for hanging on vertical surfaces, easels, etc.

Methods of Use

Cleanable articles of the invention can be readily cleaned, e.g., by simply wiping with a dry cloth, paper towel, etc., or in some instances, by wiping with a cloth, paper towel, etc. using water.

For instance, in embodiments where the article is a dry erase article, the surface of the overcoat can be readily written on, then easily cleaned. Significantly, even permanent marker writing can be easily removed with wiping, preferably after first applying water and/or water vapor (e.g., by breathing). Typically, methods of the present invention include removing permanent marker writing from the surface by simply applying water (e.g., tap water at room temperature) and/or water vapor (e.g., a person's breath) and wiping. As used herein, "wiping" refers to gentle wiping, typically by hand, with for example, a tissue, paper towel, or a cloth, without significant pressure (e.g., generally, no more than about 350 grams) for one or more strokes or rubs (typically, only a few are needed).

In some instances, cleaning the surface, e.g., erasing the dry erase board, is facilitated by using a cleaner composition, preferably a water based glass cleaner such as Windex™ Glass Cleaner (SC Johnson Co., Racine, Wis.).

EXAMPLES

The invention will be further explained with the following illustrative, non-limiting examples.

The materials utilized in the examples included:

| Material | Description | Source |
|---|---|---|
| 1,4-butane sultone | | Aldrich Chemical, St. Louis, MO |
| 3-(N,N-dimethylamino propyl)trimethoxysilane | (HO)$_3$Si~~~N$^+$~~~SO$_3^-$ | Gelest, Morrisville, PA |
| LITHISIL ™ 25 | Lithium silicate | PQ Corporation, Valley Forhe, PA |
| WPET | MITSUBISHI ™ W54B White polyester film, 3 mil, 2 side primed | Mitsubishi PET Film, LLC, Greer, SC |
| SR-351LV | Multifunctional acrylate monomer | Sartomer Company, Exton, PA |
| WINDEX ™ glass cleaner | Water based cleaner | SC Johnson Co., Racine, WI |

The following test method for evaluation of permanent marker writing removal was used.

Write on test surface with SHARPIE™ Black permanent marker. After 24 hours at room temperature, apply water to the surface. Then rub the writing on the surface with a wet paper towel. Continue rubbing until the writing is removed or there is no change in the amount of marker left on the board. Record if the writing is removed or not by the action of a wet paper towel. For permanent markers that are difficult to remove with water alone, spray some WINDEX™ glass cleaner on the writing and then wipe with a paper towel to remove.

A rewritable article with a body member having a high gloss front surface (Example 1) and one with a matte front surface (Example 2) were coated with diamond-like glass to form facing layers thereon followed by application of the zittterionic silane composition described below to form overcoats in accordance with the invention. SHARPIE™ permanent marker removability was tested after 24 hour dry times. The matte finish article of Example 2 was more abrasion resistant than the gloss article of Example 1 as indicated by the scoring observed after the seventh use.

The over coat in Example 1 was formed from a composition prepared by adding 3-(N,N-dimethylaminopropyl)trimethoxysilane (49.7 g, 239 mmol) to a screw-top jar followed by deionized (DI) water (82.2 g) and 1,4-butane sultone (32.6 g, 239 mmol). The combined reaction mixture was warmed to 75° C. and mixed for a period of 14 hours. The resultant reaction mixture was diluted to 2 wt-% in water to obtain the final coating composition which was then applied to the front surface of the body member.

In Example 2, the over coat was formed from a composition prepared as a 2 wt-% solution of [LITHISIL™ 25 lithium silicate: Example 1 preparatory composition (23:77 w/w)] in water.

After 10 uses, 100% of SHARPIE™ black permanent marker was still readily removed. The marker scored the gloss samples after the 7th use, but the roll induced matte optical structured surface sample was not scored by the marker. Therefore, durability is improved via micro-structuring of the hardcoat surface by any suitable process.

|  |  | Example 1 | | Example 2 | |
| --- | --- | --- | --- | --- | --- |
| Wipe No. | Dry Time | Wet Paper Towel Results | Spray Results | Wet Paper Towel Results | Spray Results |
| 1 | 5 min | 100% | 100% | 100% | 100% |
| 2 | 5 min | 100% | 100% | 100% | 100% |
| 3 | 5 min | 100% | 100% | 100% | 100% |
| 4 | 5 min | 100% | 100% | 100% | 100% |
| 5 | 5 min | 100% | 100% | 100% | 100% |
| 6 | 5 min | 100% | 100% | 100% | 100% |
| 7 | 5 min | 100% Scoring | 100% | 100% | 100% |
| 8 | 5 min | 100% | 100% | 100% | 100% |
| 9 | 5 min | 100% Scoring | 100% | 100% | 100% |
| 10 | 24 hours | 100% Scoring | 100% | 100% | 100% |

Although the present invention has been fully described in connection with the preferred embodiments thereof with reference to the accompanying drawing, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated by reference.

What is claimed is:

1. A method for making a cleanable article comprising: (a) providing a body member having a front surface wherein at least a portion of said front surface is siloxane-bondable, said body member comprising a polymeric matrix comprising nanoparticles wherein said matrix has been treated by exposing at least a portion of the front surface thereof to at least one of the following: plasma, corona, and flame treatment so as to expose siloxane-bondable nanoparticles; and thereafter (b) applying an overcoating composition to at least a portion of said siloxane-bondable surface, said overcoating composition comprising a siloxane-bondable component; and (c) curing said overcoat composition to form a hydrophilic overcoat having a siloxane bond to said front surface of said body member.

2. The method of claim 1 wherein said body member comprises the reaction product of a curable mixture comprising at least one curable component selected from the group consisting of (meth)acrylate monomers and (meth)acrylate oligomers.

3. The method of claim 2 wherein said curable mixture further comprises a plurality of surface-modified nanoparticles.

4. The method of claim 3 wherein said nanoparticles are selected from the group consisting of aluminum oxides, antimony tin oxide, bismuth subsalicylate, boemite, calcium carbonate, calcium phosphate, cerium dioxide, graphene, halloysite, lanthanum boride, lithium carbonate, silver, amorphous silica, colloidal silica, silicon dioxide, titanium dioxide, zinc oxide, zirconium oxide, and zirconium dioxide.

5. The method of claim 3 wherein said nanoparticles comprises a plurality of silica particles.

6. The method of claim 1 wherein the front surface of said body member has a matte finish before the overcoating composition is applied thereto.

7. The method of claim 1 wherein the front surface of said body member has a glossy finish before the overcoating composition is applied thereto.

8. The method of claim 1 wherein said body member comprises a siloxane-bondable facing layer.

9. The method of claim 8 wherein said facing layer is a diamond-like glass film.

10. A cleanable article comprising: (a) a body member having a front surface wherein said front surface is siloxane-bondable, said body member comprising a polymeric matrix comprising nanoparticles wherein said matrix has been treated by exposing at least a portion of the front surface thereof to at least one of the following: plasma, corona, and flame treatment so as to expose siloxane-bondable nanoparticles; and (b) an overcoat bonded via siloxane bonds to said front surface, said overcoat bonded to said body member after said polymeric matrix is treated to expose siloxane-bondable nanoparticles.

11. A method for using a cleanable article comprising: (a) providing a cleanable article of claim 10; and (b) writing indicia on the front surface thereof.

12. The method of claim 11 further comprising (c) erasing at least a portion of said indicia.

* * * * *

UNITED STATES PATENT AND TRADEMARK OFFICE
CERTIFICATE OF CORRECTION

PATENT NO.        : 9,527,336 B2  
APPLICATION NO.   : 14/368359  
DATED             : December 27, 2016  
INVENTOR(S)       : David Mahli et al.

Page 1 of 1

It is certified that error appears in the above-identified patent and that said Letters Patent is hereby corrected as shown below:

In the Specification

Column 6  
Line 25, delete "boemite," and insert -- boehmite, --, therefor.

Column 7  
Line 61, delete "physiosorption)" and insert -- physisorption) --, therefor.

Column 9  
Line 21, delete "thebody" and insert -- the body --, therefor.

Columns 17 & 18  
Line 27 (approx.), delete "LITHISIL ™" and insert -- LITHISIL™ --, therefor.  
Line 27 (approx.), delete "Forhe," and insert -- Forge, --, therefor.  
Line 29 (approx.), delete "MITSUBISHI ™" and insert -- MITSUBISHI™ --, therefor.  
Line 32 (approx.), delete "WINDEX ™" and insert -- WINDEX™ --, therefor.

Column 18  
Line 53, delete "zittterionic" and insert -- zwitterionic --, therefor.

In the Claims

Column 20  
Line 15 (approx.), in Claim 4, delete "boemite," and insert -- boehmite, --, therefor.

Signed and Sealed this  
Eighth Day of May, 2018

Andrei Iancu  
*Director of the United States Patent and Trademark Office*